US006211103B1

(12) United States Patent
Tomaino et al.

(10) Patent No.: US 6,211,103 B1
(45) Date of Patent: Apr. 3, 2001

(54) SYNTHETIC SILICATE PELLET COMPOSITIONS

(75) Inventors: Gary Peter Tomaino, Easton; John Albert Hockman, Bath, both of PA (US)

(73) Assignee: Minerals Technologies Inc., Bethlehem, PA (US)

( * ) Notice: Subject to any disclaimer, the term of this patent is extended or adjusted under 35 U.S.C. 154(b) by 0 days.

(21) Appl. No.: 09/416,000

(22) Filed: Oct. 12, 1999

(51) Int. Cl.$^7$ .............................. C03C 6/00; C03C 6/04; C03C 6/08
(52) U.S. Cl. ................................. 501/27; 501/29
(58) Field of Search ......................... 501/27, 29

(56) References Cited

U.S. PATENT DOCUMENTS

| 3,381,064 | 4/1968 | Yamaguchi . | |
|---|---|---|---|
| 3,458,331 | 7/1969 | Kroyer . | |
| 3,520,705 | 7/1970 | Shido et al. . | |
| 3,802,901 | 4/1974 | Robertson et al. . | |
| 3,817,776 | 6/1974 | Gringas . | |
| 3,875,288 | 4/1975 | Hoffman et al. . | |
| 3,883,364 | 5/1975 | Robertson et al. . | |
| 3,914,364 | * 10/1975 | Engellitner et al. .................. | 264/117 |
| 3,926,647 | 12/1975 | Wuhrer . | |
| 3,941,574 | 3/1976 | Melkonian et al. . | |
| 3,956,446 | 5/1976 | Eirich et al. . | |
| 3,967,943 | 7/1976 | Seeley . | |
| 3,969,100 | * 7/1976 | Kuna et al. .............................. | 65/27 |
| 4,023,976 | 5/1977 | Bauer et al. . | |
| 4,026,691 | * 5/1977 | Lovett et al. ............................ | 65/27 |
| 4,028,131 | 6/1977 | Pons . | |
| 4,110,097 | * 8/1978 | Chevallier et al. .................... | 65/136 |
| 4,252,754 | 2/1981 | Nakaguchi . | |
| 4,474,594 | 10/1984 | Lazet . | |
| 4,519,814 | 5/1985 | Demarest, Jr. . | |
| 4,612,292 | 9/1986 | Richard . | |
| 4,634,461 | 1/1987 | Demarest, Jr. et al. . | |
| 4,920,080 | 4/1990 | Demarest, Jr. . | |
| 5,004,706 | * 4/1991 | Dickinson ............................... | 501/27 |
| 5,100,840 | * 3/1992 | Urabe et al. ............................ | 501/27 |
| 5,422,320 | * 6/1995 | Adams, Jr. et al. .................... | 501/27 |
| 5,900,052 | 5/1999 | Nakajima et al. . | |

FOREIGN PATENT DOCUMENTS

| 141 105 | 4/1980 | (DE) . |
| 42 28 500 | 9/1998 | (DE) . |
| 826 630 A2 | 3/1998 | (EP) . |
| 53-139621 | 12/1978 | (JP) . |
| 55-149122 | 5/1979 | (JP) . |
| 59-64563 | 4/1984 | (JP) . |
| 2-141454 | 5/1990 | (JP) . |
| 10-291852 | 11/1998 | (JP) . |
| 644 731 | 1/1979 | (SU) . |
| 823 285 | 4/1981 | (SU) . |
| 981 217 | 12/1982 | (SU) . |
| 340 257 | 5/1983 | (SU) . |
| WO 99/33765 | 7/1999 | (WO) . |

OTHER PUBLICATIONS

"Glass", Kirk—Ohmer, Encyclopedia of Chemical Technology, 4$^{th}$ Edition 1994, vol. 12, pp. 555–569, 593–601. No month.

Mirkovich, V.V.; "Utilization of Diopside in the Manufacture of Glass," *Mines Brance Technical Bulletin TB 192*; Dept. of Energy, Mines and Resources (Ottawa, Canada 1974).

Mirkovich, V.V. et al; "Utilization of Diopside in the Manufacture of Glass, Part II"; *Journal of the Canadian Ceramic Society*; vol. 44, pp. 43–47; (1975).

\* cited by examiner

*Primary Examiner*—Karl Group
(74) *Attorney, Agent, or Firm*—Terry B. Morris; Marvin J. Powell

(57) ABSTRACT

A synthetic silicate pellet is provided having component of calcium and magnesium, either together or in the alternative. Such pellet is further provided with either an aluminate silicate binder and/or an ion flow catalyst. The synthetic silicate pellet has use as a glass batch component.

12 Claims, No Drawings

SYNTHETIC SILICATE PELLET COMPOSITIONS

TECHNICAL FIELD

The present invention relates generally to glass-making, and, more particularly, to a method of making a synthetic calcium/magnesium silicate pellet having varied properties, such synthetic silicate pellets themselves, and to the using of such synthetic silicate pellets in glass-making systems.

BACKGROUND

In general, glass-making involves the combination of precursive materials for melting and reacting together to form a desired glass composition. The volume and use of glass is such that natural resources are traditionally favored with a cost-optimal amount of beneficiation of such materials for glass-production purposes.

Some of the historical glass-making schemes involved the combining of sand (as a silica source), lime (as a calcium source) and soda ash (as a sodium source) along with other materials and processing to form the ubiquitous glass products. Such processes traditionally suffered from, and continue to suffer from, production limitations. Among the more critical limitations are batch-free time (the time required to completely dissolve the combined materials) and the fining time (the time to remove gases from the melt which form undesired bubbles in the melt and resulting glass). Other limitations involve the handling problems associated with the precursive materials, such as crumbling, dusting, clumping, sintering deficiencies and the like.

Progress has been made in the glass-making processes by the use of specially processed or beneficiated materials intended for use as glass precursive materials. In particular, a class of synthetic silicates have been developed encompassing various forms of synthetic calcium silicates, magnesium silicates and/or calcium magnesium silicates. Exemplary of such materials are SYNSIL™ synthetic silicates. While such synthetic silicates can provide beneficial results, there continues to be a need for enhanced precursive materials for the glass-making technologies.

SUMMARY

An object of the present invention is to provide a synthetic silicate as a precursive glass-making material in a composition and form which reduces handling problems in the glass-making process.

Another object of the present invention is to provide a synthetic silicate as a precursive glass-making material in a composition and form which enhances the melting process in the glass-making process.

These and other objectives are achieved by providing a synthetic silicate composition comprised of a calcium/magnesium silicate material of controlled formulation, an alumina silicate binder, a catalyst and silica fines. The binder and catalyst are alternatively present, providing respectively preferred advantages of enhanced compression strengths and enhanced sintering characteristics and yields of such synthetic silicates.

DETAILED DESCRIPTION OF INVENTION

An embodiment of the present invention is a novel composition comprising (i) a silicate material having an empirical formula of $Ca_xMg_ySi_zO_{(x+y+2z)}$, wherein the values of x, y, and z are such that at least one of x and y are not zero and the values are such that the novel composition is suitable as a glass precursor material; (ii) an alumina silicate binder in an amount effective to impart a compression strength sufficient to enable a pellet formed from the novel composition to be handled at ambient temperature and sintered without substantial structured damage to said pellet; and (iii) silica fines in an amount such that the composition is suitable as a glass precursor material. This composition has use as precursive material in the glass-making process. Other additives or elements of composition may be added with regard to the particular specific glass being produced. The manufacturer of such glass will make the adjustments to the variables of the elements of the composition so as to be suitable for his intended end glass product. pounds of water. This solution is added to the blender at a rate of 1.1 pounds per minute until hydration is complete. After the completion of water addition continue to mix for two (2) minutes. This material is then formed into one half inch in diameter pellets and air-dried for twenty-four (24) hours.

Six Percent Calcium Aluminate and Fume Silica Binder

Forty-seven (47) pounds of pebble lime, forty-seven pounds of sand, and six (6) pounds of fume silica are placed in a ribbon blender. Two (2) pounds of sodium hydroxide is dissolved in twenty-three (23) pounds of water. This solution is added to the lime, sand, and silica mixture at 1.1 pounds per minute until hydration is complete. After completion of water addition, six (6) pounds of Secar 71 cement is added to the blender and blending is continued for two (2) minutes. This material is the formed into one half inch in diameter pellets and air-dried for twenty-four (24) hours.

Twenty-one representative pellets are selected from each of the formulations above. Individual pellets are placed on the tester and evaluated as outlined above. An average of the results is given in TABLE 1.

TABLE 1

| | | Compression Strength Test (pounds) | | | | | | |
|---|---|---|---|---|---|---|---|---|
| Temperature | Ambient Temp. | 500° C. | 600° C. | 700° C. | 800° C. | 900° C. | 1000° C. | 1100° C. |
| Control | 34.3 | 56.4 | 34 | 17.1 | 12 | 3 | 1 | N/A |
| 6% Secar 71 | 61.7 | 71.6 | 31.8 | 18.0 | 20.0 | 17.6 | 25.4 | 18.8 |

EXAMPLE 2

An attrition test, as described above, is done on the pellets produced through the processes described in Example 1. An attrition test is done as described above, to determine the amount of fines produced by the dynamic motion of a rotary kiln. In this test the mixture with no binder is compared with the mixture in which six (6) percent of Secar 71 cement is added.

One embodiment of the present composition invention is a silicate material having an empirical formula of $Ca_xMg_ySi_zO_{(x+y+2z)}$. The values chosen for such empirical formula are such that the composition is suitable as glass precursor material as discussed above. Either x or y may be zero, but both x and y are not zero. Accordingly, the silicate material may be of a nature as to be a wollastonite-type ($Ca_XSi_1O_3$) material or a diopside-type ($Ca_XMg_YSi_2O_6$) material or an enstatite-type ($Mg_YSi_1O_3$) material and the like. What is meant by "type" material is exemplified as follows: a wollastonite-type material may in fact be natural or synthetic wollastonite ($Ca_1Si_1O_3$) or a compound whose elemental proportions approximates such formula. Similarly, a diopside-type material may be a natural or synthetic diopside ($Ca_1Mg_1Si_2O_6$) or a compound with similar elemental proportions. For instance, the proportions of calcium to magnesium need not necessarily be one to one. In a preferred embodiment of the present invention a preferred ratio of calcium to magnesium is about one-half to about ten, more preferably about one to about two. A particularly more preferred range is a proportion of calcium to magnesium between the values of about 1.4 to about 1.7. Similarly, an enstatite-type material may be a synthetic or natural enstatite ($Mg_1Si_1O_3$) or a compound with similar elemental proportions. For instance, an enstatite-type material may not strictly have a one to one proportion between the magnesium and silica in the compound. Accordingly the present invention involves compounds with a general empirical formula of $Ca_xMg_ySi_zO_{(x+y+2z)}$, whose relative proportions may duplicate the natural wollastonite, diopside, or enstatite material or be approximations. In all instances for the present invention, however, at least a significant amount of calcium or magnesium should be present in the silicate material. Other non-listed elements may be present in non-effective amounts in the compounds as trace or contaminant materials as long as such does not significantly alter the benefits of the present inventive compositions in the intended glass formation products. Throughout the specification it will also be appreciated by those in the art that the empirical values for the oxygen content may not strictly be x+y+2z, but will be sufficiently approximate to such so that the composition is able to perform as though mathematically balanced and chemically equivalent.

The alumina silicate binder can be any alumina silicate binder whose use permits the forming of a pellet with sufficient compression strength so as to be handled at ambient temperatures in the manufacturing process and then sintered in a kiln, furnace or other heating apparatus. Throughout this specification the "pellet" form can be of any structure or shape such as an amorphous glob, a sphere, a bead, a brickette, a cube, a wafer, a flake or a cylinder shape and the like. For instance, when sintered in a rotary kiln, the preferred formation is a cylindrical or spherical pellet whose size and aspect ratio is suitable for the intended glass manufacturing process using such pellet. A sufficient amount of the alumina silicate binder is used to substantially reduce the breakage of the pellet and the formation of powder or fines in the heating apparatus, such as those which might appear in a rotary kiln causing dust loss wall build up and kiln rings. Such formations affect the thermal profile in a heating apparatus, such as a kiln, and results subsequently in insufficient control of burning or sintering of the material. Accordingly, there should be a sufficient amount of binder so as to substantially reduce or prevent insufficient sintering of the pellet for the ultimate intended use. Prior to use in the glass-making process the pellet may be beneficiated or sized for achieving ease or enhancement in use. Accordingly, the pellet may be further treated to size the pellet down into smaller pellets. Such treatment may be by crushing, Milling or other similar processing known in the art for size reduction, such as that used for glass sand or other solid materials. Preferred pellet sizes for some applications can be as low as 30 to 200 mesh.

The alumina silicate binder comprises a form of aluminum oxide useable as a binder component. The alumina component is preferably purified or pure aluminum oxide but can comprise natural forms, such as corundum derivatives, and the like. Accordingly, the alumina silicate binder can be of or derived from any of the numerous types of clay containing various proportions of aluminum oxides and silicates and like material, such as (but not limited to) sodium aluminosilicates, sodium aluminate, zeolites and the like. The alumina silicate binder is preferably in an amount of about 0.1 to about 10 weight percent or higher. The advantage of the use of such binder is the flexibility of using a wider range of silica material (eg. sand sizes) so as to maximize pellet packing intensity with resulting enhancement of the compression strength. Such enhancement of the compressive strength is not reliant on such selection of sands in the present invention but is further enhanced thereby.

The silica fines in the present invention are those which are suitable for the intended glass use for product, such as natural sands or recycled fines from a glass-making process or other recovery. The amount of such silica fines may range up to about 60 weight percent of the composition or even higher in specific applications. In a preferred embodiment the silica fines are sands having a measurement of up to about 30 mesh size.

Another embodiment of the present invention is a composition comprising (i) a silicate material having an empirical formula of $Ca_xMg_ySi_zO_{(x+y+2z)}$, wherein the values of x, y, and z are such that at least one of x and y are not zero and the values are such that the composition is suitable as a glass precursor material; (ii) a catalyst comprising a compound selected from the group consisting of lithium, potassium and sodium, the catalyst being in an amount sufficient to effectively control the ion flow in a pellet formed from the composition so that the ion flow effectively forms the desired wollastonite-type, diopside-type or enstatite-type formation during sintering of the pellet; and (iii) silica fines in an amount such that the composition is suitable as a glass precursor material.

The catalyst useable in the present invention is a catalyst which comprises any Group I compound, preferably lithium, potassium or sodium or a combination thereof. A preferred catalyst is selected from a group consisting of lithium carbonate, lithium hydroxide, sodium carbonate and sodium hydroxide or combination thereof. The catalyst should be in an effective amount so as to react in a manner to cause a controlled melt, preferably one that allows an exchange of ions within the melt from an area of high density to an area of low density. The preferred amount of catalyst is in a range of about 0.01 to about 20 weight percent, more preferably from about 0.05 to about 5 weight percent catalyst in the composition. A preferred catalyst is sodium hydroxide in a liquid form.

Another preferred embodiment of the present invention is a composition comprising (i) a silicate material having an empirical formula of $Ca_xMg_ySi_zO_{(x+y+2z)}$, wherein the values of x, y, and z are such that at least one of x and y are not zero and the values are such that the composition is suitable as a glass precursor material; (ii) an alumina silicate binder in an amount effective to impart a compression strength sufficient to enable a pellet formed from the composition to be handled at ambient temperature and sintered without substantial structured damage to the pellet; (iii) a catalyst comprising a compound selected from the group consisting of lithium, potassium and sodium, said catalyst being in an amount sufficient to effectively control the ion flow in a pellet formed from the composition so that the ion flow effectively forms wollastonite-type, diopside-type, or enstatite-type formation during sintering of the pellet; (iv) and silica fines in an amount such that the composition is suitable as a glass precursor material. As can be appreciated from the disclosures hereinabove, this preferred embodiment provides the advantages of both the use of an alumina silicate binder and a catalyst material in the composition.

In another aspect, an embodiment of the present invention is a process for producing a sinterable mass comprising a silicate material having an empirical formula of $Ca_xMg_ySi_zO_{(x+y+2z)}$, wherein the values of x, y, and z are such that at least one of x and y are not zero and the values are such that the composition is suitable as a glass precursor material, an alumina silicate binder, an ion flow catalyst and silica, the process comprises setting the relative values of x, y, and z so that the material is suitable as a glass precursor material, and setting the binder proportion in the sinterable mass to enable formation from the mass of a form sinterable without substantial structural damage to the form.

In yet another embodiment, the present invention is a process for producing a sinterable mass comprising a silicate material having an empirical formula of $Ca_xMg_ySi_zO_{(x+y+2z)}$, wherein the values of x, y, and z are such that at least one of x and y are not zero and the values are such that the composition is suitable as a glass precursor material; an alumina silicate binder; an ion flow catalyst and silica. The process comprises setting the relative values of x, y, and z so that the material is suitable as a glass precursor material, and setting the proportion of the catalyst in the mass to effectively produce a desired diopside-type composition during sintering of the form, and form the sinterable mass into a form suitable for sintering.

A preferred embodiment is a process for producing a sinterable mass comprising a silicate material having an empirical formula of $Ca_xMg_ySi_zO_{(x+y+2z)}$, wherein the values of x, y, and z are such that at least one of x and y are not zero and the silicate material is suitable as a glass precursor material, an alumina silicate binder, an ion flow catalyst and silica. The process comprises setting the relative values of x, y, and z so that the material is suitable as a glass precursor material, setting the binder proportion in the sinterable mass to enable formation from the mass of a form sinterable without substantial structural damage to the form, and setting the proportion of the catalyst in the mass to effectively produce a desired diopside-type composition during sinterable of the form, and form the sinterable mass into a form suitable for sintering.

In yet another embodiment, the present invention is a method of producing a molten glass using a synthetic silicate precursor which reduces handling problems and enhances the melting process to produce the molten glass. This method involves heating (1) silica with (2) a batch component which provides the major portion of sodium in the resultant molten glass and (3) provides the synthetic silicate, as described hereinabove, having the desired amounts of magnesium and calcium components. The synthetic silicate is advantageous by virtue of its similar particle size, distribution and density to the primary glass-making precursive material (eg. sand) which minimizes potential segregation of precursive materials. In addition, unlike limestone or a dolomite, the synthetic silicate is not as subject to decrepitation during heating. Further, the synthetic silicates are not considerably friable so as to create dust during batching or other handling during the glass-making processes. Accordingly, a preferred method is forming a synthetic silicate pellet in accordance with to one of the inventive embodiments described hereinabove and combining such with the necessary amounts of silica and sodium to form a desired molten glass and heating such material to form such molten glass. The sources of silica and sodium can be those typical in the glass industry and the glass batching procedure of a type typically used in glass melting processes.

Accordingly, one embodiment of the present invention is a process for producing a molten glass comprising heating silica with a batch component comprising a source of sodium and a synthetic silicate pellet comprising a silicate material having an empirical formula of $Ca_xMg_ySi_zO_{(x+y+2z)}$, wherein the values of x, y, and z are such that at least one of x and y are not zero and the values are such that the composition is suitable as a glass precursor material; an alumina silicate binder in an amount effective to impart a compression strength sufficient to enable a pellet formed from the composition to be handled at ambient temperature and sintered without substantial structured damage to the pellet; and silica fines in an amount such that the composition is suitable as a glass precursor material.

Another embodiment is a process for producing a molten glass comprising heating silica with a batch component comprising a source of sodium and a synthetic silicate pellet comprising a silicate material having an empirical formula of $Ca_xMg_ySi_zO_{(x+y+2z)}$, wherein the values of x, y, and z are such that at least one of x and y are not zero and the values are such that the composition is suitable as a glass precursor material; a catalyst comprising a compound selected from the group consisting of lithium, potassium and sodium, the catalyst being in an amount sufficient to effectively control the ion flow in a pellet formed from the composition so that the ion flow effectively forms wollastonite-type, diopside-type, or enstatite-type formation during sintering of the pellet; and silica fines in an amount such that the composition is suitable as a glass precursor material.

In yet a more preferred embodiment, the present invention is a process for producing a molten glass comprising heating silica with a batch component comprising a source of sodium and a synthetic silicate pellet comprising a silicate material having an empirical formula of $Ca_xMg_ySi_zO_{(x+y+2z)}$, wherein the values of x, y, and z are such that at least one of x and y are not zero and the values are such that the composition is suitable after sizing as a glass precursor material; an alumina silicate binder in an amount effective to impart a compression strength sufficient to enable a pellet formed from the composition to be handled at ambient temperature and sintered without substantial structured damage to the pellet; a catalyst comprising a compound selected from the group consisting of lithium, potassium and sodium, said catalyst being in an amount sufficient to effectively control the ion flow in a pellet formed from the composition so that the ion flow effectively forms the desired wollastonite-type, diopside-type, or enstatite-type formation during sintering of the pellet; and silica fines in an amount such that the composition is suitable as a glass precursor material. The preferred values for x and y are as stated hereinabove as well as the preferred aluminum silicate binders and catalysts.

In all the above glass embodiments, an optional amount of silica fines to increase pellet compression strength can be used.

The following examples are illustrative of the present invention but do not limit the scope thereof.

The following terms are described to assist in the understanding of the experiments, but are not to limit the scope of the invention herein.

Muffle Furnace

Laboratory scale furnace in which temperature can be adjusted in order to simulate the heat of a rotary kiln. Used for measuring pellet strength at various temperatures.

Rotary Kiln

A refractory lined cylinder, usually inclined, which rotates and can be heated. In this application it provides for commercial scale reaction of the pellets.

Compression Tester

The tester consists of a platform that has a piston positioned above it. The piston is slowly lowered at a fixed velocity until it comes into contact with the pellet and the pellet breaks apart. The instrument provides the pounds of force required to break the pellet.

Attrition Tester

A 3 foot by 6-inch cylinder that rotates end to end. The amount of breakage of pellets at hot temperatures can be determined and the tester simulates a rotary kiln.

Glass Sand

A low iron industrial sand of the size used by the glass industry for providing the source of silicon dioxide (silica, or α-quartz type materials, for examples).

Ribbon Blender Mix Hydration Test

This test is to determine the degree of hydration of CaO in a ribbon blender mix. This test utilizes a moisture balance, platinum crucible, analytical balance and lab furnace. Before performing this test the amount of CaO and MgO in the original lime sample must be determined (EDTA titration is the easiest way to determine this). Also, the lime/sand ratio used in the ribbon blender mix must be known. A sample from the ribbon blender mix is placed the moisture balance to drive off all free moisture and dry weight recorded. The material is placed into the crucible and heated to 600 C for thirty (30) minutes. The material is reweighed and placed back into the furnace at 950 C for thirty (30) minutes. The calcined material is reweighed. Using these weights and the information about the lime/sand samples, degree of hydration can be determined.

Pellets

Mixing and hydrating the dolomitic lime and calcium oxide generates a mixture that is rolled into "pellets" and air-dried. Pellets are roughly one half inch in diameter.

Soak

Dwell times at a certain temperature that a pellet is subjected to in the furnace or kiln.

Cold Compression Strength Test

Used to determine the strength of dried pellets at ambient temperature.

Hot Compression Strength Test

Used the evaluate the compression strength of pellets over a set thermal profile. The same tester is used to measure hot compression strength as cold compression strength.

Pellet Attrition Test

This simulates the dynamics of a rotary kiln to test for breakage and production of fines of standard pellets. Representative pellets are selected and placed in a lab furnace at a desired temperature for thirty (30) minutes. Remove the pellets and allow to cool enough for handling. Two hundred fifty (250) grams of pellets (larger than 6 mesh) are weighed out and carefully poured into the attrition tube (described above). Rotation speed is set at one revolution per minute for thirty (30) minutes. At the end of the rotation cycle, the contents are emptied from the attrition tube onto a 6-mesh sieve and lightly shaken to pass the fines through the sieve. The material that did not filter through the sieve is then weighed to determine the amount of fines that were lost through the sieve.

Sintering

Pellets are passed through a muffle furnace or rotary kiln in which a temperature profile is followed to produce a desired product.

Kiln Ring

A powder or fines build-up on the wall of the kiln. This causes changes in the thermal profile of the kiln thus reducing efficiency.

"Secar 71"

Brand of calcium aluminate cement produced by La Farge Cement. This is a fast setting cement that is advertised as 30% calcium and 70% aluminate.

Binder Additive for Pelletization:

Example 1 and Example 2 illustrates the increase in pellet strength when a cement is added to aid in binding the components of the invention. After the components of the formulation are mixed together, the material is then "rolled" into one half inch diameter pellets. Compression and attrition testing is done as described below.

EXAMPLE 1

Control Batch

Seventy-two (72) pounds of pebble lime and seventy-seven (77) pounds of sand are placed in a ribbon blender. Three (3) pounds of sodium hydroxide is dissolved in thirty-six (36)

After thirty (30) minutes in the attrition tester the control pellets had sixty seven and one half (67.5) percent fines while the pellets with six (6) percent binder had only fifteen and one tenth (15.1) percent fines. This correlates to over a seventy-seven (77) percent increase in usable product when using a binder.

Effect of a Catalyst on Producing Desired Product

EXAMPLE 3

In this example, six hundred (600) grams of pulverized dolomitic lime is mixed with seven hundred thirty one (731) grams of silica in a ribbon blender. Seven hundred thirty (730) grams of water are added and mixed three (3) minutes. This gives a material that is formed into one half-inch cubes and dried overnight at 110° C. A second mixture is made according to this procedure except that one (1) percent, by dry wt., NaOH is dissolved in the water and this solution is added to the lime/silica mix. The results are shown in TABLE 2.

TABLE 2

Catalyst Effect of NaOH

| | "Control Experiment" 1350° C. - 45 minutes No NaOH | 1350° C. - 45 minutes With NaOH |
|---|---|---|
| Substance | % Crystalline Phase | % Crystalline Phase |
| Diopside | 2–4 | 51–68 |
| α-Quartz | 45–60 | 7–10 |
| Cristobalite | 2–4 | 2–4 |
| Akermanite | 2–4 | 10–15 |
| Merwinite | 2–4 | 2–4 |
| Lime | 2–4 | None detected <0.5 |
| Periclase | 10–15 | 2–4 |
| Y-$Ca_2SiO_4$ | 7–10 | None detected <1.0 |

TABLE 2-continued

Catalyst Effect of NaOH

| | "Control Experiment" 1350° C. - 45 minutes No NaOH | 1350° C. - 45 minutes With NaOH |
|---|---|---|
| Larnite, $Ca_2SiO_4$ | 2–4 | None detected <1.0 |
| Cyclowollastonite, $CaSiO_3$ | 2–4 | None detected <1.0 |
| Monticellite, $CaMgSiO_4$ | None detected <0.5 | 4–7 |
| Amorphous Phase (glass-$SiO_2$, Ca/Mg silicate) | <5 | <5 |

What is claimed is:

1. A composition comprising a silicate material having an empirical formula of $Ca_xMg_ySi_zO_{(x+y+2z)}$, wherein the values of x, y, and z are such that at least one of x and y are not zero and said values are such that said composition is suitable as a glass precursor material; and an alumina silicate binder in an amount effective to impart a compression strength sufficient to enable a pellet formed from said composition to be handled at ambient temperature and sintered without substantial structural damage to said pellet.

2. A composition suitable for forming a sinterable pellet having an ion flow during a controlled melt, said composition comprising a silicate material having an empirical formula of $Ca_xMg_ySi_zO_{(x+y+2z)}$, wherein the values of x, y, and z are such that at least one of x and y are not zero and said values are such that said composition is suitable as a glass precursor material; and a catalyst comprising a compound selected from the group consisting of lithium, potassium and sodium, wherein said sodium content is about 5 weight percent or less based on said composition, said catalyst being in an amount sufficient to effectively control said ion flow in a pellet formed from said composition so that said ion flow effectively forms wollastonite, diopside, or enstatite formation during sintering of said pellet.

3. The composition of claim 2 comprising a silicate material having an empirical formula of $Ca_xMg_ySi_zO_{(x+y+2z)}$, wherein the values of x, y, and z are such that at least one of x and y are not zero and said values are such that said composition is suitable as a glass precursor material; an alumina silicate binder in an amount effective to impart a compression strength sufficient to enable a pellet formed from said composition to be handled at ambient temperature and sintered without substantial structured damage to said pellet; a catalyst comprising a compound of an element of an element selected from the group consisting of lithium, potassium and sodium, said catalyst being in an amount sufficient to effectively control the ion flow in a pellet formed from said composition so that said ion flow effectively forms wollastonite, diopside, or enstatite formation during sintering of said pellet; and silica fines in an amount such that said composition is suitable as a glass precursor material.

4. The composition of claim 1 having a ratio of x to y of about one-half to about ten.

5. The composition of claim 4 wherein said ratio is about one to about two.

6. The composition of claim 1 comprising about 0.1 to about ten weight percent of the binder.

7. The composition of claim 2 wherein the catalyst comprises one or more compounds selected from the group consisting of lithium carbonate, lithium hydroxide, sodium carbonate and sodium hydroxide.

8. The composition of claim 2 comprising about 0.01 to about twenty weight percent of the catalyst.

9. The composition of claim 8 wherein the catalyst is sodium hydroxide in an amount about 0.05 to about 5 weight percent.

10. The composition of claim 3 wherein said silica fines are sands having a measurement of up to about 30 mesh size.

11. The composition of claim 2 wherein the catalyst is in an amount to effectively form diopside formation.

12. The composition of claim 3 wherein the catalyst is in an amount to effectively form diopside formation.

* * * * *

UNITED STATES PATENT AND TRADEMARK OFFICE
CERTIFICATE OF CORRECTION

PATENT NO. : 6,211,103 B1
DATED : April 3, 2001
INVENTOR(S) : John Albert Hockman; Gary Peter Tomaino It is certified that error appears in the above-identified patent and that said Letters Patent is hereby corrected as shown below:

Column 2,
Line 25, "pounds of water. This solution..." and finishing at column 2, line 65, "...cement is added.", should be moved to column 8, line 30, after "...thirty six (36)".
Line 31, "Six Percent Calcium Aluminate and Fume Silica Binder", should be underlined.

Column 6,
Line 66, "The following examples are illustrative of the present invention but do not limit the scope thereof" should be moved to column 8, line 16, after "...and 70% aluminate".

Column 7,
Line 4, "Muffle Furnace" should be underlined.
Line 8, "Rotary Kiln" should be underlined.
Line 12, "Compression Tester" should be underlined.
Line 18, "Attrition Tester" should be underlined.
Line 23, "Glass Sand" should be underlined.
Line 27, "Ribbon Blender Mix Hydration Test" should be underlined.
Line 43, "Pellets" should be underlined.
Line 47, "Soak" should be underlined.
Line 50, "Cold Compression Strength Test" should be underlined.
Line 53, "Hot Compression Strength Test" should be underlined.
Line 57, "Pellet Attrition Test" should be underlined.
Line 54, should read "Used [the] to evaluate".

Column 8,
Lines 5, "Sintering" should be underlined.
Line 9, "Kiln Ring" should be underlined.
Line 13, " 'Secar 71'" should be underlined.
Line 26, "Control Batch" should be underlined.

UNITED STATES PATENT AND TRADEMARK OFFICE
CERTIFICATE OF CORRECTION

PATENT NO. : 6,211,103 B1
DATED : April 3, 2001
INVENTOR(S) : John Albert Hockman; Gary Peter Tomaino It is certified that error appears in the above-identified patent and that said Letters Patent is hereby corrected as shown below:

Column contd.
Line 19, should read "Example 1 and Example 2 illustrate[s]".
Between lines 16 and 17 there should be a space.
Between lines 36 and 37 there should be a space.

Signed and Sealed this

Sixteenth Day of October, 2001

Attest:

NICHOLAS P. GODICI
Attesting Officer     Acting Director of the United States Patent and Trademark Office